US011050639B2

(12) United States Patent
Lau

(10) Patent No.: US 11,050,639 B2
(45) Date of Patent: Jun. 29, 2021

(54) FLOW BASED DYNAMIC TIME-OUT

(71) Applicant: T-Mobile USA, Inc., Bellevue, WA (US)

(72) Inventor: Kevin Lau, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 45 days.

(21) Appl. No.: 16/222,369

(22) Filed: Dec. 17, 2018

(65) Prior Publication Data

US 2020/0195522 A1    Jun. 18, 2020

(51) Int. Cl.
*H04L 12/24*    (2006.01)
*H04L 12/841*    (2013.01)

(52) U.S. Cl.
CPC ...... *H04L 41/5025* (2013.01); *H04L 41/5032* (2013.01); *H04L 47/28* (2013.01)

(58) Field of Classification Search
CPC .. H04L 41/5025; H04L 41/5032; H04L 47/28
USPC ....................................................... 709/224
See application file for complete search history.

(56) References Cited

U.S. PATENT DOCUMENTS

| 5,719,882 | A * | 2/1998 | Ellis | H04L 41/0213 709/237 |
| 8,468,196 | B1 * | 6/2013 | Roskind | H04L 67/325 709/203 |
| 9,524,330 | B1 * | 12/2016 | Allocca | G06Q 30/06 |
| 10,176,449 | B1 * | 1/2019 | Krohn | G06Q 10/087 |
| 2008/0046785 | A1 * | 2/2008 | Gilgen | G06F 13/24 714/47.1 |
| 2016/0234118 | A1 * | 8/2016 | Picon Cabezudo | H04L 47/12 |

OTHER PUBLICATIONS

Dixit et al., Timeout-based Adaptive Consensus: Improving Performance through Adaptation, 2012, ACM (6 pages).*

* cited by examiner

*Primary Examiner* — Wing F Chan
*Assistant Examiner* — Leon Y Tseng
(74) *Attorney, Agent, or Firm* — Han Santos, PLLC

(57) ABSTRACT

Described herein are a system and techniques for increasing efficiency of communications and quality of a user's experience by implementing dynamic time-out intervals. When a service slows due to demand, malfunction on the server side, or local constraints near the client such as local wireless network connectivity, a client-side time-out interval can be dynamically increased so that clients are less likely to depart before receiving requested services. A server that cannot provide requested services can indicate that a client-side time-out interval should be zero so that clients do not wait on a request that will not be fulfilled. A server seeing service requests but few completions or satisfied service requests can indicate different time-out intervals to different clients, observe which intervals have higher completion success rates and then indicate revised time-out intervals accordingly.

19 Claims, 3 Drawing Sheets

FLOW BASED DYNAMIC TIME-OUT

BACKGROUND

In today's connected world of electronic communications, personal electronic devices such as a smart phone, tablet, laptop computer or other personal user equipment (UE) with computing power and electronic communications capability are increasingly used by their owners to access information and services via distributed networks often including the Internet as well as telecommunication service provider networks that provide wireless and other communication services. Communications between the user equipment and service providers can be transacted in a context of a client-server relationship, and rules or practices such as "time-out" intervals, that can indicate how long each side of the communication will wait for further communication from the other side, can influence both system efficiency and a quality of the user's communication experience.

BRIEF DESCRIPTION OF THE DRAWINGS

The detailed description is described with reference to the accompanying figures. In the figures, the left-most digit(s) of a reference number identifies the figure in which the reference number first appears. The same reference numbers indicate similar or identical items.

DETAILED DESCRIPTION

Figure 1:
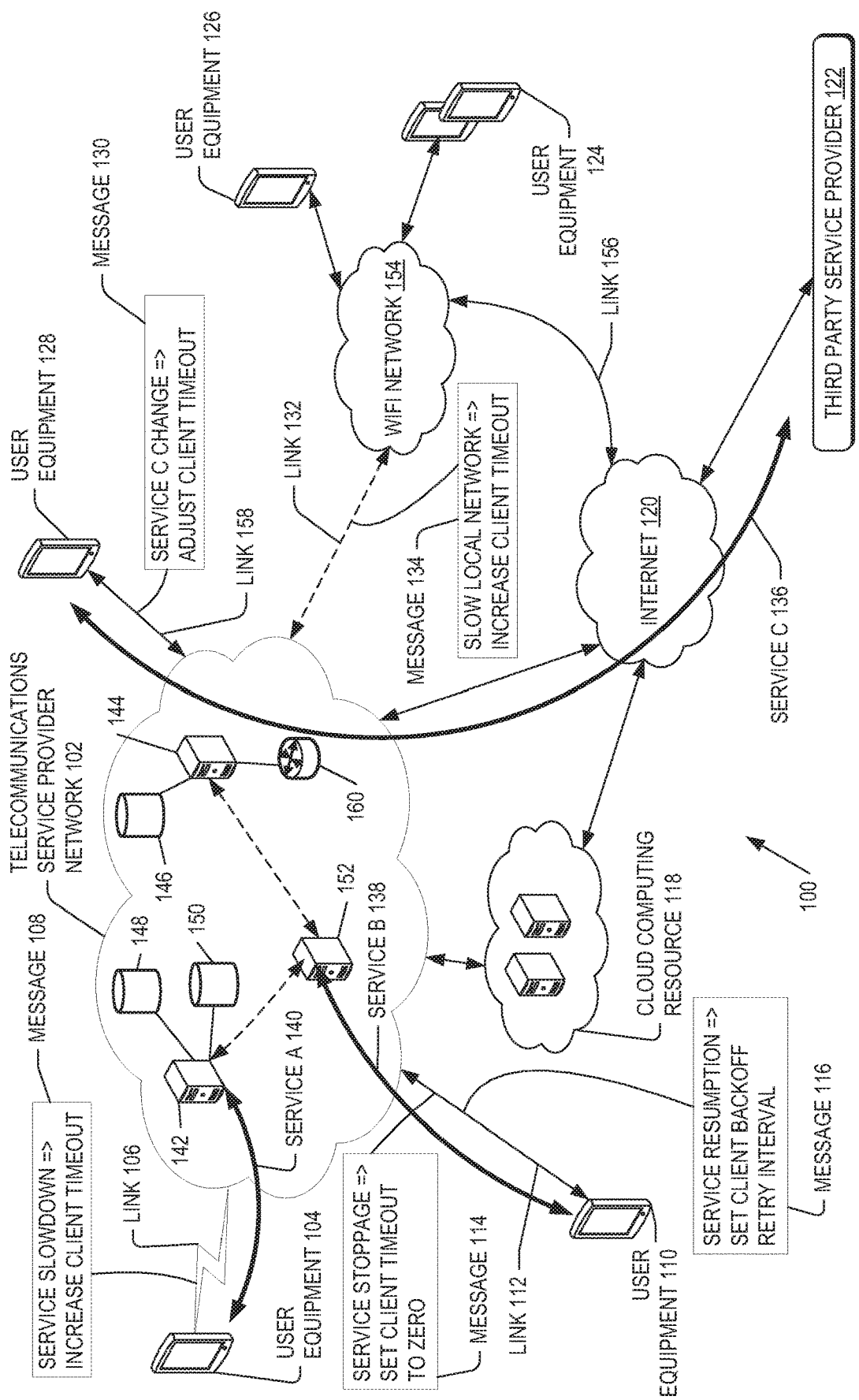
FIG. 1 shows an illustrative computing environment and network architecture for implementing techniques for dynamic time-outs in client-server communications.

This disclosure is directed to systems and techniques for implementing dynamic time-out intervals to improve client-server communications between a) user equipment such as mobile phones, tablets, and laptop computers, or for example mobile clients on user devices such as mobile phones that are acting as clients in client-server communications, and b) services provided by or through a network such as a telecommunications service provider network that includes wireless connections between the network and at least some of the user equipment.

Computer and network systems often implement a "time-out" for function calls or other requested communications or services. The time-out or time-out interval is a time interval or a time window of particular length in which a communication reply or a satisfaction of a request is expected. If a reply or satisfactory response is not received within the time window then the communication can for example be repeated, dropped, purged, started anew from a beginning, or put on hold for a later attempt or re-try.

Although time-outs or time-out intervals are often fixed or static in nature, dynamically adjusting time-outs based on network conditions can provide technical efficiencies of lower consumption of system resources such as transmission bandwidth and memory and accompanying economies in capital equipment, energy and memory requirements, as well as improved user experiences due to faster completion of service requests and less time wasted waiting for service that will not be timely provided. In addition, monitoring telecommunication system telemetry and dynamically adjusting time-outs allows problems to be detected earlier, so they can be addressed or resolved for example by reducing customer expectations, spinning up additional resources, fixing root causes and so forth, to increase efficient use of available technical resources and increase or preserve customer goodwill.

More particularly, computer and network systems often implement a "time-out" for function calls to enable systematic and efficient communications, for example to ensure that problematic transactions do not queue infinitely or indefinitely in memory and contribute to problems such as system outages due to overload. However, this practice can be inefficient and can contribute to negative customer experiences when the system that customers are interacting with is not performing normally or nominally, for example when the system is enduring a partial service outage, network latency, partial hardware failure, additional compute loads on shared/supporting compute nodes, and so forth. For example, mobile client applications often set a time-out value of 30 or 60 seconds to help ensure that slight delays along the data flow do not cause the client application to time-out prematurely and fail to receive information or services that it would have otherwise received if the time-out had been longer. However, a Cumulative Density Function (CDF) of the latency can often be under 5 seconds at a 90% confidence level. In other words, 90% of the time, the server responds in less than 5 seconds. If a partial service outage or degradation in quality or speed of service is occurring but overall the system is still functioning, the CDF of the response time can for example be 10 seconds to 15 seconds. It is possible then to use other system telemetry along the data flow of the service in question to derive or determine a time-out value for one or more links of the data flow (or a single, cumulative time-out interval) based on real-time upstream system telemetry, that improves user experiences with that service and/or improves the system's ability to efficiently provide the service.

FIG. 1 shows an illustrative computing environment 100 and network architecture for implementing techniques for dynamic time-outs in client-server communications, for example with the support of a telecommunications service provider network 102 provided and administered by a telecommunications service provider. The telecommunications service provider network includes and facilitates wireless connections with user equipment, for example according to subscriber agreements between owners or users of the user equipment and the telecommunications service provider. As shown in FIG. 1, the telecommunications service provider network 102 connects directly to user equipment 104, 110, 128 respectively via links 106, 112, 158. These and other links shown in FIG. 1 connecting the telecommunications service provider network 102 and user equipment 104, 110, 128 with each other and with other elements in FIG. 1, as well as links between other elements in FIG. 1, can be any appropriate link, wireless or not. For the sake of illustration the link 106 is shown as a wireless link, but alternatively can be a non-wireless link. Non-wireless links can include fiber optics, electrically conductive materials, and so forth, and example links can be formed by combinations of wireless and non-wireless links. Thus, other links shown in FIG. 1 for example the links 112, 158, 132 and additional links shown between various elements in FIG. 1 can also be wireless or non-wired communication links or various combinations thereof. The telecommunications service provider network 102 also connects indirectly to user equipment 126, 124 via a wireless network 154 such as a WiFi™ network that in turn optionally connects directly to the telecommunications service provider network 102 via a link 132 or indirectly through a link 156 and the Internet 120, to which the telecommunications service provider network 102 connects. Server-side services can originate within the telecommunications service provider network 102 and connect with user equipment functioning as client devices as illustrated in FIG. 1 with Service A (140) and Service B (138). In addition, the telecommunications service provider network 102 can act as a communications conduit between a server or third party service provider and a user equipment connected to the telecommunications service provider network, to support delivery of client-server services or communications, for example service C (136) between the user equipment 128 and a third party service provider 122. It will be understood that although only a few user equipment devices are shown in FIG. 1 with respect to the services described herein, they can represent many other user equipment devices partaking of those services, and other services can be provided.

In a first embodiment or scenario when system or server performance degrades, client device or client application time-outs are increased to help ensure that the client applications don't prematurely abandon communications with the system or server providing services to the client. Particularly where the services are being provided by a telecommunications service provider that has control over both the server providing service and communication links between the server and the customer's user equipment (the client), for example where the user equipment connects to the server via wireless service provided by the telecommunications service provider, the telecommunication service provider can have good telemetry for both function and status of the server, as well as status and function of communication conduits between the mobile phone and the server. Accordingly, a time-out for the customer's user equipment can be adjusted upwards to compensate for congestion in the communication conduits and/or service slowdowns or degradation at the server and can also be adjusted downwards when communication conduit performance or server performance later increases or is restored. This is shown generally in FIG. 1, with reference to Service A (140) between the user equipment 104 and a server 142 within the telecommunications service provider network 102. The server 142 can be directly supported by data stores 148, 150 and can also be supported directly by a server 152, and indirectly by a server 144 which connects to the server 152. The server 142 can also be supported by a data store 146 which connects to the server 144, through the server 144. For example, computational tasks can be offloaded from the server 142 to the servers 152, 144. If the Service A (140) needs repetitive data access to the data store 146, data from the data store 146 can be relayed through the servers 144, 152, 142 and duplicated into the data stores 148, 150 for quicker access by the server 142. As indicated in a message 108 the server 142 can indicate to the user equipment 104 that a time-out interval for the Service A (140) should be increased to compensate for a slowdown. Causes of a slowdown can include, for example, server 142 encountering a partial malfunction or needing to devote resources to support server 152 in its provision of Service B (138) if Service B is higher priority or to load balance, or needing to temporarily devote resources to replicate data from data store 146 into one or both of data stores 148, 150 to thereafter enable faster provision of Service A (140). Additional causes of a slowdown can include for example a degradation in quality or capability of the link 106 between the user equipment 104 and the server 142. Then, after the cause of the slowdown has been resolved or mitigated, the server 142 can signal the user equipment 104 that a time-out interval can be reduced.

In a second embodiment or scenario, when a server or system suffers a performance change that effectively causes provision of a service to clients to cease or fall below a threshold value, the server or system can alert clients communicating with it that a time-out for that service should be zero, so that the client resources and the user goodwill aren't wasted waiting for or attempting to request a service that will not be provided in an expected, reasonable or practical timeframe. This is illustrated in FIG. 1 with respect to the Service B (138) between the server 152 within the telecommunications service provider network 102 and the user equipment 110, where the Service B (138) degrades to a point where provision of the service ceases or falls below a minimum threshold and the server 152 elects to terminate provision of the service until problems are resolved. In that event, the server 152 sends a message 114 to the user equipment 110 indicating that the time-out interval should be set to zero. Later the server 152 can send a message 116 to the user equipment 110 indicating that service is resuming, and including a back-off time (e.g., a time interval to a next retry or attempt by a client to request service from a server).

In a third embodiment or scenario, a system providing a service via one or more servers, which can advantageously be a telecommunications service provider operating a telecommunications service provider network such as the network 102 and that also has access to telemetry for at least some communication links between the servers and user devices/clients, can determine that problems appear to be local for some clients, by observing and analyzing available telemetry data for various intervening links and also tracking response times, behaviors, and general location information of clients. If the system sees that a group of clients are suffering similar slow-down issues and this group of clients have characteristics in common that can indicate causes of the slow-down, the system can adjust time-out intervals particularly for that group of clients to mitigate the slow-down or service degradation and optionally gather more information regarding the service degradation.

For example, consider a situation where the system can see that clients are connecting to the service through different wireless network hotspots (e.g., WiFi™ hotspots) in a city that are located in restaurants or cafes, for example by looking at Internet Protocol (IP) addresses of the clients and/or other information. If the system sees that all clients at one of the wireless hotspots are having trouble receiving the services but clients at other wireless hotspots are not having similar trouble, the system can determine that this particular wireless network hotspot is experiencing connectivity issues and can adjust or set a time-out interval tailored for clients at that hotspot. For example, the system can set or recommend a longer time-out to enable successful service completions before connections or requests time out, or if the degradation is too severe or causes quality of the requested service to fall below a minimum threshold level then the system can set the time-out at zero and optionally send a message to clients at that problematic wireless network or hotspot indicating that problems appear to be arising at the hotspot rather than on the server side. This situation is shown generally in FIG. 1 with respect to the wireless network or hotspot 154, to which the user equipment 126 and 126 are connected.

The wireless network 154 can connect directly to the telecommunications service provider network 102 via a link 132, or alternatively can connect through a link 156 to the Internet 120 which in turn connects to the telecommunications service provider network 102. Although a particular service isn't shown in FIG. 1 with respect to the user equipment 124, 126 through the wireless network 154, a service like the Service B (138) could also run to the wireless network 154 through either the link 132 or the Internet 120 and link 156. The server 152 can use telemetry to discern that the user equipment 126, 124 is experiencing a service slowdown or degradation because there is a problem local to the wireless network 154, and relay a message 134 to the user equipment 124, 126 via the link 132 (or alternatively via the link 156) to increase their client time-out intervals to mitigate the problems and allow the user equipment service requests time to complete.

Additional messages can be relayed from the server 152 as warranted by developing conditions, for example to further increase time-out intervals if service delivery continues to degrade, to shorten time-out intervals if service delivery improves, to set client time-out intervals to zero if a service level drops below a threshold value or level, and so forth. The server 152 can also send a message notifying the user equipment 124, 126 that there is likely a local problem with the local wireless network or hotspot that is disrupting requested services, and/or suggesting that the user equipment 124, 126 switch from local wireless network (e.g., WiFi™) service to cellular data service if users desire better service performance.

In a fourth embodiment or scenario, a telecommunications service provider provides communication services between a wireless user equipment such as a smart phone, and one or more third party service providers on the Internet. FIG. 1 shows an example, in which a Service C (136) is provided by a third party service provider 122 to the user equipment 128. A communications path of Service C (136) runs from the user equipment 128 via a link 158 to the telecommunications service provider network 102, through that network and then through the Internet 120 to the third party service provider 122. For communications that are not encrypted, the telecommunications service provider, for example via the server 144 in conjunction with a router 160 through which communications between the user equipment 128 and the third party service provider 122 pass, can see those communications and track performance of both the user equipment 128 and the third party service provider 122.

In the fourth embodiment, the telecommunications service provider can take an active role in managing the Service C (136) and related communications between the user equipment 128 and the third party service provider. Reasons to do this can include protecting the telecommunications service provider network 102 from overload due to sudden increases in commercial demand, malfunctions or malicious attack, as well as to help maintain or increase a quality of experience for mobile subscribers and customers such as an owner of the user equipment 128 and function cooperatively with the third party service provider by using telemetry data that the third party service provider may not be aware of. Optionally, the telecommunications service provider can selectively share telemetry data with the third party service provider to support delivery of services by the third party service provider. In particular, if the responses and performance of the user equipment 128 and/or the third party service provider 122 indicate problems that can be mitigated by revising time-outs of one or both of the user equipment 128 or the third party service provider 122, the telecommunications service provider can interject time-out adjustments (for example via the server 144) into the communication stream between the user equipment 128 and the third party service provider 122. The telecommunications service provider can also adjust time-outs or time-out intervals based on problems it sees with the communications service it is providing to support the communication stream between the user equipment 128 and the third party service provider 122. Adjustments can be provided for example via a message 130 from the telecommunications service provider network 102 to the user equipment 128 indicating that performance of the Service C (136) has changed (or has not changed as expected or desired) and thus an adjustment to the time-out interval observed or implemented by the user equipment 128 is directed or recommended. In an event that the third party service provider sends a message to the user equipment 128 directing or recommending a time-out interval or other parameter of communication related to the Service C (136), the telecommunications service provider can optionally modify or update that information before relaying it to the user equipment 128. The modification or revision can for example be based on additional information that the telecommunications service provider (or an agent or aspect thereof such as the network 102, server 144, etc.) has, such as telemetry regarding the communications path of the Service C (136) through the telecommunications service provider network 102 or insight from the monitored communications between the third party service provider and clients. The telecommunications service provider can optionally inform the third party service provider 122 of adjustment messages such as the message 130 to the user equipment, and can optionally advise the third party service provider 122 as to time-out intervals or other communication parameters that it recommends or directs the third party service provider 122 to adopt with respect to provision of the Service C (136) to the user equipment 128, or to other communications the third party service provider may direct towards the telecommunications service provider network. Note that any appropriate element or functionality of the telecommunications service provider can perform the observation, analysis and control functions described with respect to this fourth embodiment and other embodiments. For example, the server 144 can perform these functions, or can perform them in conjunction with other elements within the telecommunications service provider network 102 such as one or more of the servers 152, 142 and data stores 148, 146, 150.

Further in the fourth embodiment, in an event that degraded service performance of service C (136) between one or more user equipment such as the user equipment 128 and the third party service provider 122 applies an excessive burden on the telecommunications service provider, the telecommunications service provider can set the client time-out interval to zero or vary client time-out intervals and retry time intervals to reduce load on both the third party service provider and the telecommunications service provider. This can occur in situations where for example 1) the degraded service performance requires resources of the telecommunications service provider network 102 to track and keep open communications between the user equipment and the third party service provider, and those resources would provide greater benefit or value if applied to other users, or 2) the service performance provided by the third party service provider to the user device falls below a minimum threshold. Such a threshold can, for example, be based on a ratio of service requests successfully completed, to time and/or resources consumed or to a number of unsuccessful service requests or to a combination or composite value thereof. Such a threshold can apply in any of the embodiments described herein where setting a time-out interval to zero is contemplated.

There are also further variations that can apply to each of the four embodiments. For example, in a situation where a service may be coming back online or improving, as described for example further above with respect to Service B (138), time intervals for time-outs and system retries can be set differently for different clients so that the service isn't inundated with service requests as it ramps up. For example, exponential back-off can be used, where a first back-off time for a retry is 1 second, then after an unsuccessful retry the back-off time (e.g., a time interval to a next retry or attempt by a client to request service from a server) is increased to 10 seconds, and then the next time to 100 seconds, and so forth. Other back-off schemes featuring different incrementing algorithms can also be used. In addition, different clients can be given different back-off times—a first client can be given a time of 1 second, a second client 5 seconds, yet another client 10 seconds, and so forth. The different times can be assigned randomly amongst clients, and/or can be assigned based on a level of service that a given client or user has contracted for as part of the user's subscription plan with the telecommunications service provider. Thus, a customer or client who has contracted for a higher level of service, can be given time-out intervals or back-off times that provide preferred access to the service or a greater likelihood of successfully receiving requested services. Different clients within a given service level can be randomly assigned different back-off times and/or time-out intervals, and different service levels can have different ranges of back-off times and/or time-out intervals, so that on average, or generally, clients in a given service level will have different results than clients in a different service level commensurate with respective subscription agreements between the users and the telecommunications service provider. Varying of time-out intervals and/or back-off times for different clients or user equipment can also be done periodically to see how a service or system on the server side responds, for example after experiencing degradation. Results can help identify trending changes in the service and can also help identify particular time-out intervals and/or back-off time intervals that are consistently successful, or unsuccessful and thus should be used or avoided and/or can be used to help troubleshoot and diagnose problems with the service.

Resources and capabilities to perform the functions of the telecommunications service provider described herein with respect to services such as the Services A (140), B (138), C (136) and others can be concentrated or variously distributed within systems operated by the telecommunications service provider. For example, the telecommunications service provider network 102 can use servers, data stores, routers and other resources within it to variously perform or support the functions described herein. Some or all of these functions can also be outsourced to, or augmented by, cloud computing resources acting under direction, authorization, or control of the telecommunications service provider, for example the cloud computing resource 118 connected to the telecommunications service provider network 102 as shown in FIG. 1.

Figure 2:
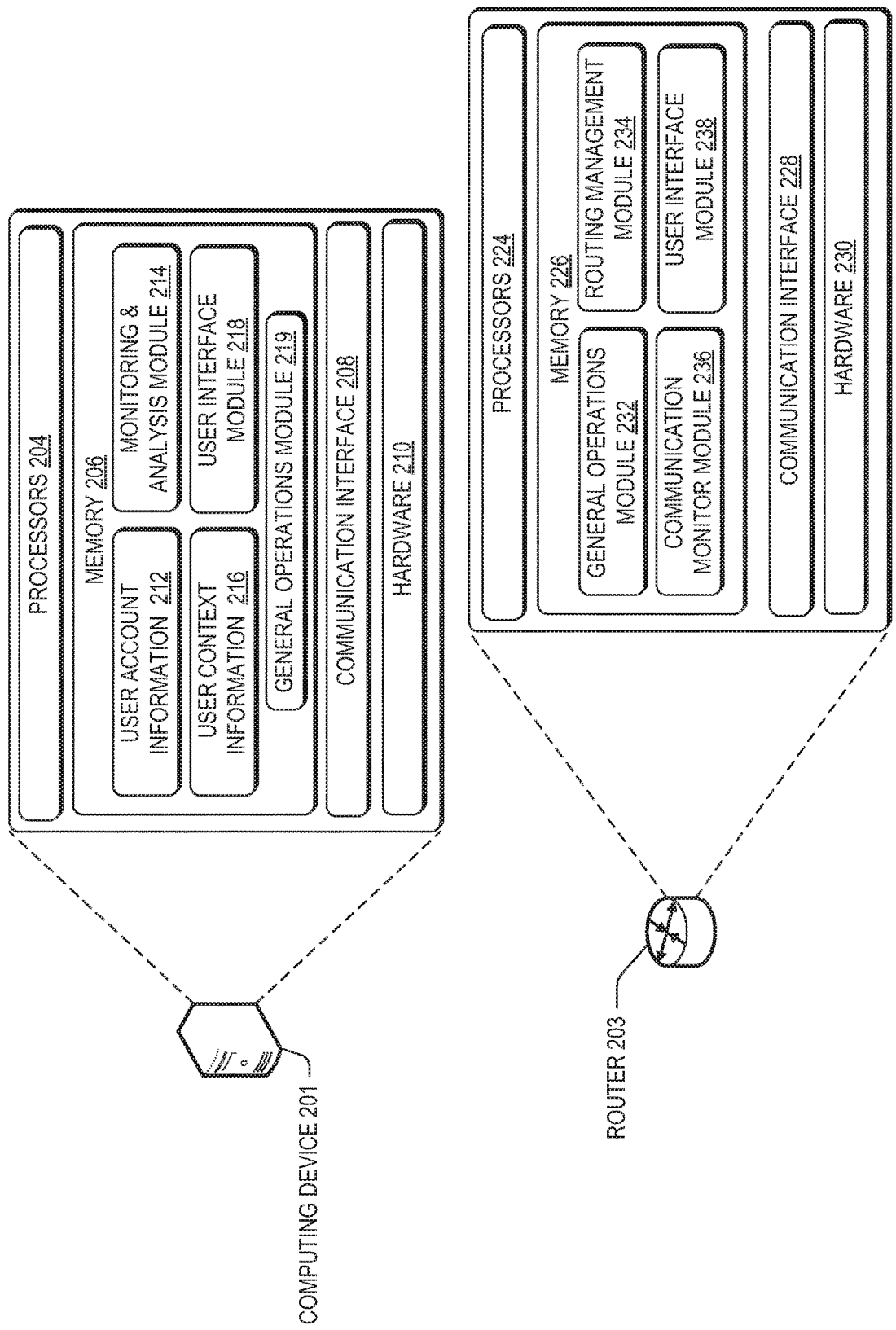
FIG. 2 shows illustrative details for various servers and user equipment to implement different aspects of the architecture shown in FIG. 1.

FIG. 2 shows illustrative details of a computing device 201 and a router 203 that can support, or be variously implemented as, the system components and functions shown in FIG. 1 and/or functions described herein with respect to various embodiments and scenarios.

Figure 3:
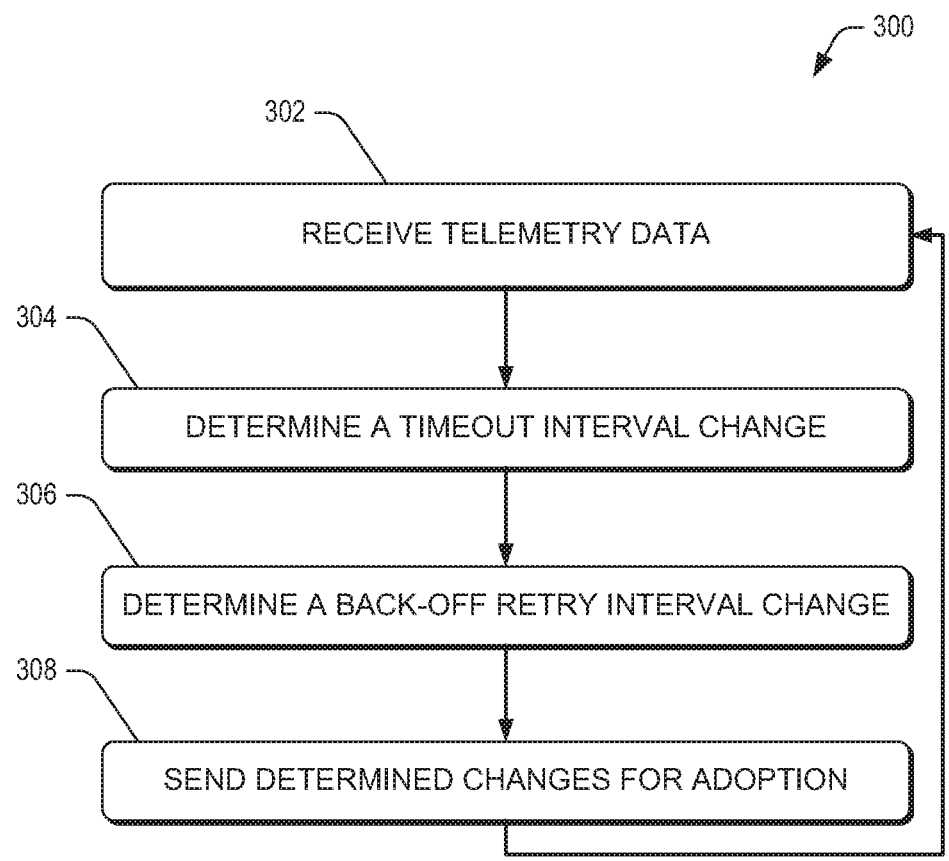
FIG. 3 is a flow diagram of an illustrative process for implementing techniques for dynamic time-outs in client-server communications.

One or more instances of the computing device 201 can for example form a basis for the user equipment 104, 110, 128, 126, 124 as well as for other equipment and functions of the telecommunications service provider network 102 including for example the servers 142, 152, 144 and servers within the cloud computing resource 118 as well as various functions described with respect to the process of FIG. 3. Instances of the computing device 201 can also support various functions within the wireless network 154 and/or can provide server and computational functions within the Internet 120 and the third party service provider 122. The computing device 201 includes processors 204, hardware 210, and a communication interface 208. The computing device 201 also has a memory 206 that includes (but is not limited to) the various software modules shown. A user context information module 216 can facilitate storage of and access to user context information gathered by or through the user equipment 104, 110, 124, 126, 128 as well as from other sources. The user account information module 212 can contain information about one or more user accounts with a telecommunications service provider as well as for user accounts with third party entities, from either a client perspective (e.g., information on a user equipment owned or controlled by the user) or from a server/service provider perspective (e.g., information about the user and their account that is resident on, or accessible to, a telecommunications service provider with whom the user has a service subscription or a third party entity providing services to the user). The monitoring and analysis module 214 can support communication monitoring and analysis functions of the servers 142, 144, 152 and router 160 as described herein, as well as monitoring and analysis functions in the user equipment 104, 110, 124, 126, 128 that can implement and adjust communication functions in cooperation with the communication interface 208. The general operations module 219 can support different functions of various applications running on the computing device 201 including tasks delegated from other devices or services. The user interface module 218 can provide user interface functions and capability for the user equipment 104, 110, 124, 126, 128 as well as for the servers 142, 144, 152 to enable users and administrators or technicians to access and operate the user equipment and servers.

One or more instances of the router 203 can be variously located within and support routing functions within the telecommunications service provider network 102, and can also be included within and support operations of the cloud computing resource 118, Internet 120 and optionally the third party service provider 122. The router 203 includes processors 224, a communication interface 228, hardware 230, and a memory 226 that contains various software modules including a routing management module 234 that supports various routing functions of the router 203. A communication monitor module 236 can support monitoring of communications between the router 203 and other entities, for example message traffic relating to the Service C (136), to support analysis and management functions performed by the server 144 or other elements of the telecommunications service provider or telecommunications service provider network 102 with respect to the Service C (136) as described in regards to the fourth embodiment. Also included are a user interface module 238 to facilitate direct communications with a human operator if needed, and a general operations module 232 that can enable the router 203 to accept and accomplish various tasks for the system or subsystem to which it more particularly belongs.

The memories 206, 226 optionally include computer-readable storage media. Computer-readable storage media can include or encompasses volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave.

FIG. 3 illustrates a process that encompasses embodiments and scenarios variously described herein. In a first block 302, telemetry data is received. As noted earlier, this telemetry data can include data regarding performance of servers providing services, performance of clients receiving services, and status, function or performance of communication conduits conveying information between the clients and servers. Some of this telemetry can be directly gathered by a telecommunications service provider that provides the services via servers that it controls, and/or provides communication paths between clients and servers and can thus gather telemetry regarding the communication paths. In addition, the telecommunications service provider (or one or more agents under its aegis or direction) can optionally make inferences regarding client and local network performance (and performance of third-party servers proving services) based on communications observed on the communication paths, as noted earlier.

From block 302 the process moves to block 304, where a time-out interval change is determined, consistent with the embodiments described further above. For example, a determined change can be to increase the time-out interval, as in a situation of partial service outage as in the first embodiment or as in a situation of local network slowdown/partial disruption as in the third embodiment, or either case as in the fourth embodiment. In a case of service outage, as for example in the second embodiment and sometimes the fourth embodiment, the time-out interval can be changed to zero. If system or service performance is increasing over time, the time-out interval can also be shortened from a long interval or increased from a zero interval to reflect this increase or restoration of service or system capability. In addition, as noted further above, different time-out intervals can be selected for transmission to or use by different clients, for example based on a contracted telecommunications or service level per each user's telecommunications subscription or subscription level for a particular service, so that different clients (belonging to users) receive or experience different levels of service performance. Further, different time-out intervals can be selected for different clients or different groups or classes of clients for troubleshooting or system tuning purposes, to see which intervals produce better performance results. In addition, different time-out intervals for different clients can be alternatively or additionally selected to spread load on a service as it comes back online or ramps up to a higher performance level, so that different clients apply different time-out intervals randomly selected for them and/or selected for them based on terms of their contractual service agreements with the telecommunications service provider and/or provider of a specific service being provided, e.g., the Service A (140), Service B (138), or Service C (136). If a determination is made that no changes to time-out intervals for one or more clients or servers are needed or desirable, then time-out intervals for those clients or servers can remain the same, in other words, a determined change can be zero (no change).

From block 304 the process continues to block 306, where a back-off retry time interval change is determined. As noted further above, back-off retry time interval changes or adjustments can come into play when a service is ramping up performance or coming back online from a service outage and can be done in conjunction with time-out interval adjustments. Adjustments among different clients can be done randomly by client and/or at least partially based on contracted service or subscription levels of specific users/clients. If a determination is made that no changes to back-off retry time intervals for one or more clients are needed or desirable, then back-off retry time intervals for those clients can remain the same, in other words, a determined change can be zero (no change).

From block 306 the process moves to block 308, where any determined time-out interval and back-off retry time interval changes are communicated to clients and/or servers for adoption by those clients and/or servers. From Block 308 the process can return to block 302, and iteratively repeat at regular intervals and/or based on incoming new telemetry information.

All or some of the operations and functions variously described herein with respect to example embodiments and scenarios and the process shown in FIG. 3 can be variously re-ordered, performed sequentially or in parallel, and performed iteratively. For example, blocks 304 and 306 can be performed simultaneously, telemetry data in block 302 can be received at any time, and determined changes can be sent out in block 308 while next sets of telemetry data are being received, and next sets of time-out interval changes and/or back-off retry time interval changes are being determined.

In particular with respect to a user's location data or other user information that can be useful to improve delivery of services requested by users, user-configurable privacy and security safeguards can be provided for this and other personal information regarding the user that is held by or accessible to the telecommunications service provider, for example in the telecommunications service provider node and also on the user equipment 104, 110, 124, 126. Personal user information can include but is not limited to the user's contacts database or address book, account information, and contextual information regarding use and status of the user equipment (location, movement history, communications history and so forth). Privacy and security safeguards can be provided to apprise the user when the user's third party accounts are accessed by the telecommunications service provider and for what purposes, and also to apprise the user when third party entities access or request access to user information held by the telecommunications service provider. These privacy and security safeguards can be user-configurable so that the user can set and revise them as needed or desired.

Various embodiments provide technical advantages that enable greater service and functionality to be provided to users with greater efficiency and lower resource cost. For example, adjusting time-out intervals as variously described herein increases communication and task completion efficiency which also reduces wastage of resources including energy consumption and equipment requirements and improves customer experiences as well as enabling efficient delivery of tiered service. In other words, adjusting time-out intervals and back-off retry time intervals as variously described herein enables provision of high quality service to customers contracting for that level of service as well as efficient provision of promised service to customers contracting for lower levels of service by efficiently using and allocating system resources.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network device, comprising:
at least one processor;
a network interface;
a storage device coupled to at least one processor; and
software instructions stored in the storage device, wherein execution of the software instructions by the at least one processor configures the network device to:
receive telemetry data regarding a communication status between at least one server and a plurality of clients, the telemetry data including an average response time of the at least one server to service requests from the plurality of clients, the at least one server associated with at least one service;
receive, from a user equipment in communication with the network device, a request to access the at least one service;
determine a time-out interval for the user equipment with respect to the server of the at least one server based on the telemetry data; and
send the time-out interval for adoption by the user equipment.

2. The network device of claim 1, wherein the telemetry data indicates that the server's performance has decreased under a performance threshold and the time-out interval is greater than a time interval associated with a performance of the server that is above the performance threshold.

3. The network device of claim 1, wherein the telemetry data indicates that the server's performance has decreased since a prior set of telemetry data and the time-out interval is larger than an immediately preceding time-out interval of the user equipment with respect to the at least one server.

4. The network device of claim 1, wherein the telemetry data indicates that the server's performance has decreased under a performance threshold and the time-out interval is zero.

5. The network device of claim 1, wherein:
the telemetry data indicates that a rate of completion of the service requests is below a performance threshold; and
execution of the software instructions by the at least one processor further configures the network device to determine an increased back-off retry time interval for the user equipment and send the increased back-off retry time interval for adoption by the user equipment.

6. The network device of claim 1, wherein:
the at least one processor further configures the network device to:
determine different back-off retry time intervals for different ones of the plurality of clients with respect to the server;
send the different back-off retry time intervals for adoption by the different ones of the plurality of clients;
based on a subsequent correlation between the different back-off retry time intervals and corresponding rates of completion of service requests from each of the plurality of clients to the server, determine revised back-off retry time intervals for the plurality of clients with respect to the server; and
send the revised back-off retry time intervals for adoption by the plurality of clients.

7. The network device of claim 1, wherein:
the at least one processor further configures the network device to:
determine different time-out intervals for different ones of the plurality of clients with respect to the server;
send the different time-out intervals for adoption by the different ones of the plurality of clients;
based on a subsequent correlation between the different time-out intervals and corresponding rates of completion of service requests from each of the plurality of clients to the server, determine revised time-out intervals for the plurality of clients; and
send the revised time-out intervals for adoption by the plurality of clients.

8. The network device of claim 1, wherein:
the at least one processor further configures the network device to:
determine, based at least on the response times and rates of completion, a capability status of a local network connecting at least one of the plurality of clients to the server;
based on the capability status of the local network and response times and rates of completion for one or more of the plurality of clients connecting to the server through the local network, determine revised time-out intervals for the one or more of the plurality of clients connecting to the server through the local network; and
send the revised time-out intervals for adoption by the one or more of the plurality of clients connecting to the server through the local network.

9. A method, comprising:
receiving telemetry data regarding a communication status between at least one server and a plurality of clients, the telemetry data including an average response time of the at least one server to service requests from the plurality of clients, the at least one server associated with at least one service;
receiving, from a first client, a request to access the at least one service;
determining a time-out interval for the first client with respect to a server of the at least one server based on the telemetry data; and
sending the time-out interval for adoption by the first client.

10. The method of claim 9, wherein the telemetry data indicates that the server's performance has decreased since a prior set of telemetry data and the time-out interval is larger than an immediately preceding time-out interval of the client for the server.

11. The method of claim 9, wherein the telemetry data indicates that the server's performance has decreased under a performance threshold and the time-out interval is zero.

12. The method of claim 9, wherein:
the telemetry data indicates that a rate of completion of the service requests is below a performance threshold; and
the method further comprises:
determining an increased back-off retry time interval for the first client; and
sending the increased back-off retry time interval for adoption by the first client.

13. The method of claim 9, wherein:
the method further comprises:
determining different back-off retry time intervals for different ones of the plurality of clients with respect to the server;
sending the different back-off retry time intervals for adoption by the different ones of the plurality of clients;
based on a subsequent correlation between the different back-off retry time intervals and corresponding rates of completion of service requests from each of the plurality of clients to the server, determining revised back-off retry time intervals for the plurality of clients with respect to the server; and
sending the revised back-off retry time intervals for adoption by the plurality of clients.

14. The method of claim 9, wherein:
the method further comprises:
determining different time-out intervals for different ones of the plurality of clients with respect to the server;
sending the different time-out intervals for adoption by the different ones of the plurality of clients;
based on a subsequent correlation between the different time-out intervals and corresponding rates of completion of service requests from each of the plurality of clients to the server, determining revised time-out intervals for the plurality of clients; and
sending the revised time-out intervals for adoption by the plurality of clients.

15. The method of claim 9, wherein:
the method further comprises:
determining, based at least on the response times and rates of completion, a capability status of a local network connecting at least one of the plurality of clients to the server;
based on the capability status of the local network and response times and rates of completion for one or more of the plurality of clients connecting to the server through the local network, determining revised time-out intervals for the one or more of the plurality of clients connecting to the server through the local network; and
sending the revised time-out intervals for adoption by the one or more of the plurality of clients connecting to the server through the local network.

16. One or more computer-readable storage media storing instructions that, when executed by one or more processors, cause the processors to perform acts comprising:
receiving telemetry data regarding a communication status between at least one server and at least one client, the communication status including an average response time of the at least one server to service requests from the plurality of clients, the at least one server associated with at least one service;
receiving, from a first client, a request to access the at least one service;
determining a time-out interval for the first client with respect to a server of the at least one server based on the telemetry data; and
sending the time-out interval for adoption by the first client.

17. The computer-readable storage media of claim 16, wherein the telemetry data indicates that the server's performance has decreased under a performance threshold and the time-out interval is greater than a time interval associated with a performance of the server that is above the performance threshold.

18. The computer-readable storage media of claim 16, wherein:
the acts further comprise:
determining different back-off retry time intervals for different ones of the plurality of clients with respect to the server;
sending the different back-off retry time intervals for adoption by the different ones of the plurality of clients;
based on a correlation between the different back-off retry time intervals and corresponding rates of completion of service requests from each of the plurality of clients to the server, determining revised back-off retry time intervals for the plurality of clients with respect to the server; and
sending the revised back-off retry time intervals for adoption by the plurality of clients.

19. The computer-readable storage media of claim 16, wherein:
the acts further comprise:
determining, based at least on the response times and rates of completion, a capability status of a local network connecting at least one of the plurality of clients to the server;
based on the capability status of the local network and response times and rates of completion for one or more of the plurality of clients connecting to the server through the local network, determining revised time-out intervals for the one or more of the plurality of clients connecting to the server through the local network; and
sending the revised time-out intervals for adoption by the one or more of the plurality of clients connecting to the server through the local network.

* * * * *